March 13, 1951 L. E. ELFES 2,545,139
STEP PLATE
Filed July 8, 1948
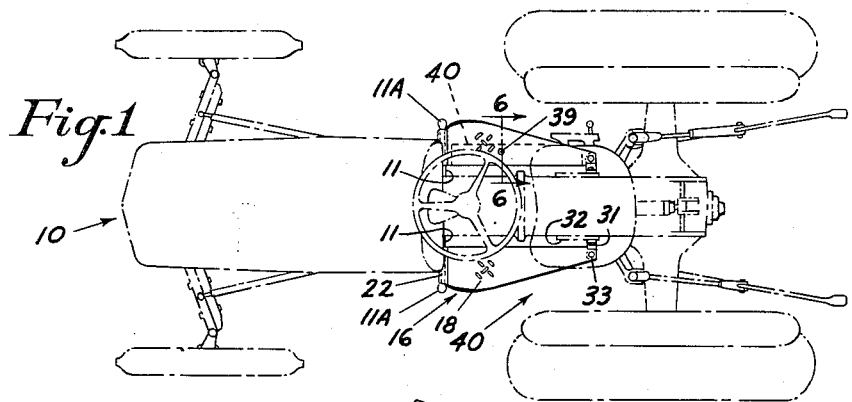
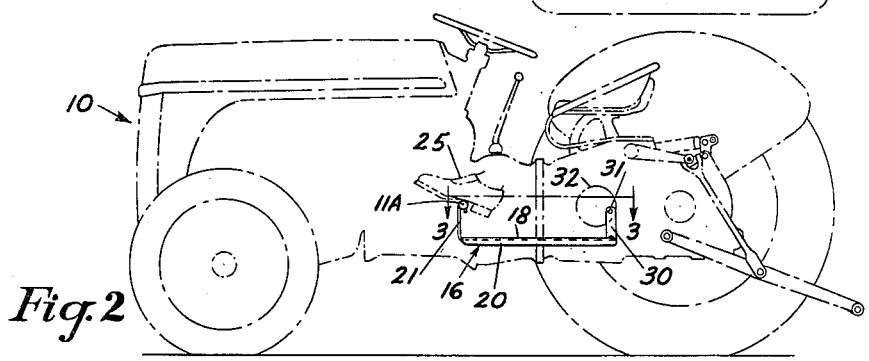
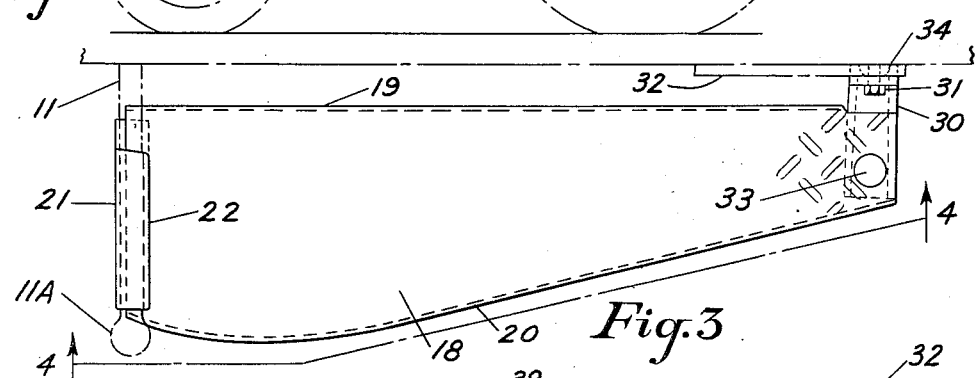
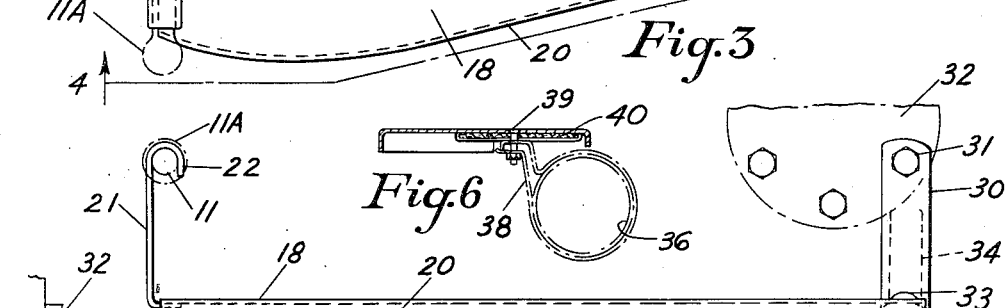
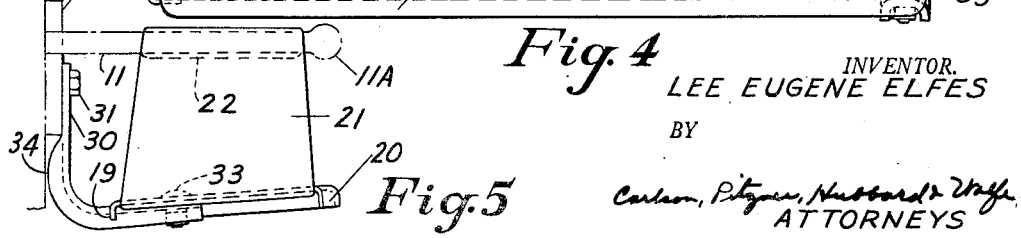
INVENTOR.
LEE EUGENE ELFES
BY
Carlson, Pitzner, Hubbard & Wolfe
ATTORNEYS Patented Mar. 13, 1951

2,545,139

UNITED STATES PATENT OFFICE 2,545,139

STEP PLATE

Lee Eugene Elfes, Detroit, Mich., assignor to Harry Ferguson, Inc., Detroit, Mich., a corporation of Delaware Application July 8, 1948, Serial No. 37,592

3 Claims. (Cl. 280—163)

The present invention relates to tractors and more particularly to an operator's foot support for use thereon.

It is the primary object of the present invention to provide an improved step plate which provides maximum comfort and convenience for the operator and increased tractor utility. It is a related object to provide a step plate which offers maximum safety, being constructed in such manner as to retain necessary clearances and to shield both the feet of the operator and portions of the tractor from catching on high brush or the like. It is a further and more detailed object to provide a step plate which is inexpensive to manufacture and which may be easily and quickly applied to a tractor, utilizing the step rod conventionally supplied as part of the tractor.

Other objects and advantages of the invention will become apparent from the following detailed description taken in connection with the accompanying drawings in which:

Figure 1 is a plan view of a tractor in outline having installed thereon a pair of improved step plates in accordance with my invention.

Fig. 2 is a view of the tractor of Figure 1 in elevation.

Fig. 3 is a detailed plan view of the step plate taken along line 3—3 of Fig. 2.

Fig. 4 is a detailed elevation of the improved step plate taken along line 4—4 of Fig. 3.

Fig. 5 shows the appearance of the step plate when viewed directly from the front.

Fig. 6 discloses a mounting detail and is a section taken along the line 6—6 of Fig. 1.

While the invention is susceptible of various modifications and alternative constructions and uses, I have shown in the drawing and will herein describe in detail one embodiment of the invention. It is to be understood, however, that I do not intend to limit the invention by such disclosure, but aim to cover all modifications and alternative constructions and uses falling within the spirit and scope of the invention as expressed in the appended claims.

Referring more particularly to the drawings the tractor 10 disclosed in outline in Figs. 1 and 2 will be recognized as a light weight tractor employing the Ferguson hitch. Tractors of this type have been conventionally supplied with step rods 11 projecting laterally from the tractor and fastened more or less integrally to the transmission housing thereof. Such step rods are designed to be engaged by the feet of the operator while he is seated and have the advantage that the operator may tilt his feet upwardly or downwardly about the point of support in order to provide the most restful supporting position. Such step rods have the further advantage that their clearance between the body of the tractor and the rear wheels is kept at a maximum. Because of such advantages and the inherent low cost of the design, step rods have been standard equipment for a number of years.

In accordance with the present invention however an improved step plate is provided which extends from the step rod rearwardly to a point generally under the tractor seat and, although supported by the step rod, does not interfere with the normal use thereof. In the drawing the step plates, two in number, have been designated by the numeral 16. Preferably the flat portion 18 thereof is constructed of steel having a raised design providing a non-skid surface. The edges of the flat portion are turned downwardly to provide an inner skirt 19 and an outer skirt 20 to eliminate any sharp edge and to provide increased strength and rigidity.

At the forward end of the step plate is a hanger plate 21 which is curled inwardly at its top edge to provide a hook portion 22. Such hook portion is formed so as to snugly engage the shank of the step rod 11 and is retained against endwise sliding on the rod both by reason of the rear point of attachment to be described and by a ball or enlargement 11A at the end of the rod 11 which is normally provided to prevent the operator's foot from slipping from the rod. Preferably the hanger plate 21 extends downwardly a sufficient amount to provide clearance for the operator's heel to enable use of the rod in the conventional manner. To illustrate the latter a shoe is shown in outline at 25 (Fig. 2) and if desired the heel may be lowered into a plate-supported position. Being able to use the step rod 11 in the usual way in spite of the presence of the plate is helpful particularly where the operator is used to such foot support or is traveling over rough terrain requiring him to brace himself firmly in the tractor seat.

In order to support the rear end of the step plate an L-shaped hanger or bracket 30 is provided which is channeled for maximum cantilever rigidity. As disclosed in detail in Figs. 4 and 5, the upper end of the bracket is bolted to the tractor body, preferably by using one of the bolts 31 associated with the pump access plate 32. A lower connection is effected by a bolt 33. Although the bracket is flattened in the region of the bolt 31, it is designed to practically touch the tractor wall at a lower point 34 to prevent bending of the flattened portion as the operator puts his weight on the step plate.

On the right side of the tractor the manner of supporting the step plate is somewhat different. Here, as shown in Fig. 6, the exhaust tube 36 which extends fore and aft along the tractor is surrounded with a strap 38, the ends of which are bolted to the step plate by means of a bolt and nut 39. As shown, the strap is so arranged that increased tightening of the bolt 39 causes an increasingly firm grip on the exhaust tube 36. If desired, a sheet of asbestos 40 may be used at the point of attachment of the strap 38 to insulate the step plate against the transmission of heat from the exhaust tube.

To prevent any tendency for the operator's foot to slip sideways from the plate, the hanger plate 21 at the front end of the plate and the bracket 30 at the rear end are shaped as shown in Figure 5 to cause the step plate to be tilted inwardly. This angle also increases the comfort afforded by the plate since it corresponds closely to the natural angle of the foot when the operator is in the normal straddling position.

In accordance with one of the more detailed aspects of the invention, the flat portion 18 of the step plate is of a width at its forward end which corresponds generally to the length of the step rod but which tapers evenly toward the rear point of mounting. The advantage of such construction is twofold. In the first place the width is the greatest at the forward portion of the step plate, which is normally used by the operator, and a minimum at the little-used portion under the tractor seat. Even more important, however, the construction preserves a maximum clearance between the tractor wheels and the tractor body as indicated at 40 in Fig. 1. This reduces the possibility that objects will be caught between the heavy tread on the tractor wheels and the body of the tractor as the latter moves along the field. Further it enables easy access for the purpose of repair or adjustment of the parts associated with the tractor rear end, particularly the Ferguson linkage.

Safety is also afforded by the shielding effect of the step plate construction. It is often necessary to drive a tractor into places that are difficult of access because of high brush and the like. With the plate installed as shown, however, it will be noted that the operator's foot is completely surrounded or shielded by the plate, and the chances of his foot or clothing being caught in the brush are minimized.

To apply the improved step plate to a tractor it is merely necessary to hook the portion 22 of the plate 21 over the step rod 11, to remove the bolt 31, and to clamp the end of the bracket 30 thereunder. On the right hand side of the tractor a strap 38 is placed around the exhaust tube 36 and the nut and bolt clamping arrangement 39 suitably tightened. Thus mounted, the step plate is not only sufficiently rigid and durable to withstand the weight of an operator on any portion thereof, but it is also inherently proof against damage from external sources. Removal is just as easily effected.

The advantages of comfort and convenience to the operator are apparent. Particularly in the case of children, the plate serves as a convenient step for mounting the tractor and as a restful and safe support. While the step rod 11 can be used in the conventional manner, those of less than average height will appreciate the accommodation to various leg lengths which the construction affords. Whenever it becomes necessary for the operator to stand in order to achieve greater visibility, regardless of whether the tractor is at rest or in motion, the step plate provides a broad and positive base.

I claim as my invention:

1. A tractor step plate for a tractor having a laterally projecting step rod thereon comprising, in combination, a flat foot-supporting portion arranged to extend fore and aft alongside the tractor body, a hanger plate at the front end of said flat portion and extending upwardly therefrom, said hanger plate having at its upper edge a curled over hook portion adapted to snugly hook over the step rod, and a bracket at the rear end of said flat portion extending inwardly toward the tractor body and having an upright end portion adapted to be fastened to the tractor body, said bracket serving as a cantilever support for said flat portion of the step plate.

2. For use with a tractor having a laterally projecting step rod thereon, the latter being provided with an enlarged head portion, the combination, comprising a flat foot-supporting plate arranged to extend fore and aft alongside the tractor body, a hanger plate at the front end of said foot supporting plate and extending upwardly therefrom, the upper edge of said hanger plate being formed for hooking over the step rod along the length thereof, and cantilever supporting bracket at the rear end of said flat portion for attachment to the tractor body, the upper edge of said hanger plate being further formed to interfere with the head portion on said step rod to prevent movement of the plates outwardly with respect to said tractor.

3. A step plate for a tractor having a laterally projecting step rod thereon comprising, in combination, a flat foot-supporting portion, a hanger plate at the forward end of said flat portion extending upwardly therefrom and being shaped for suspending said flat portion from said step rod in an inwardly tilted position, said flat portion extending rearwardly along the tractor body into the region of the tractor rear axle and to a point inside the tractor wheel, said flat portion having at its forward end a width corresponding generally to said step rod and tapering smoothly to a decreased width adjacent the tractor rear wheel to provide maximum clearance between the edge of the step plate and said tractor rear wheel.

LEE EUGENE ELFES.

REFERENCES CITED

The following references are of record in the file of this patent:

FOREIGN PATENTS

| Number | Country | Date |
|--------|---------|------|
| 387,561 | Great Britain | Feb. 9, 1933 |